(12) United States Patent
Moccagatta et al.

(10) Patent No.: US 6,339,658 B1
(45) Date of Patent: Jan. 15, 2002

(54) ERROR RESILIENT STILL IMAGE PACKETIZATION METHOD AND PACKET STRUCTURE

(75) Inventors: Iole Moccagatta, Thousand Oaks; Osama K. Al-Shaykh, San Diego, both of CA (US)

(73) Assignee: Rockwell Science Center, LLC, Thousand Oaks, CA (US)

( * ) Notice: Subject to any disclaimer, the term of this patent is extended or adjusted under 35 U.S.C. 154(b) by 0 days.

(21) Appl. No.: 09/265,277

(22) Filed: Mar. 9, 1999

(51) Int. Cl.[7] .............................. G06K 9/46; G06K 9/36
(52) U.S. Cl. ...................................... 382/240; 382/248
(58) Field of Search ................................. 382/239, 240, 382/248, 263, 274, 232, 251, 260; 348/430, 398, 408, 447, 453

(56) References Cited

U.S. PATENT DOCUMENTS

| | | | | |
|---|---|---|---|---|
| 5,563,960 A | * | 10/1996 | Shapiro | 382/239 |
| 5,657,085 A | | 8/1997 | Katto | 348/398 |
| 5,764,805 A | * | 6/1998 | Martucci et al. | 382/238 |
| 5,956,088 A | * | 9/1999 | Shen et al. | 348/385 |

FOREIGN PATENT DOCUMENTS

| | | | | |
|---|---|---|---|---|
| EP | 0517141 A | 12/1992 | | H04N/7/133 |
| EP | 0642272 A | 3/1995 | | H04N/7/24 |
| EP | 10336651 | 12/1998 | | H04N/7/30 |

OTHER PUBLICATIONS

Redmill, et al., "The EREC: An Error–Resilient Technique for Coding Variable–Length Blocks of Data", *IEEE Transactions on Image Processing*, vol. 5, No. 4, pp. 565–574, Apr. 1996.

(List continued on next page.)

*Primary Examiner*—Jose L. Couso
*Assistant Examiner*—Duy M. Dang
(74) *Attorney, Agent, or Firm*—Akin, Gump, Strauss, Hauer & Feld, L.L.P.; Gregory K. Goshorn

(57) ABSTRACT

A packetization method and packet structure improve the robustness of a bitstream generated when a still image is decomposed with a wavelet transform. The wavelet coefficients of one "texture unit" are scanned and coded in accordance with a chosen scanning method to produce a bitstream. The bitstreams for an integral number of texture units are assembled into a packet, each of which includes a packet header. Each packet header includes a resynchronization marker to enable a decoder to resynchronize with the bitstream if synchronization is lost, and an index number which absolutely identifies one of the texture units in the packet to enable a decoder to associate following packets with their correct position in the wavelet transform domain. The header information enables a channel error to be localized to a particular packet, preventing the effects of the error from propagating beyond packet boundaries. The invention is applicable to the pending MPEG-4 and JPEG-2000 image compression standards.

29 Claims, 11 Drawing Sheets

OTHER PUBLICATIONS

Embedded Image Coding Using Zerotrees of Wavelet Coefficients, Jerome M. Shapiro, IEEE Transaction on Signal Processing, vol. 41, No. 12, Dec. 1993, pp. 3445–3462.*

Adaption to Nonstationarity of Embedded Wavelet Code Stream, Xiaolin Wu, KAi Uwe Barthel and Gerhard Ruhl, Proceedings 1998 International Conference On Image Processing, Oct. 4, 1998, pp. 322–325.

Robust Wavelet Zerotree Image Compression With Fixed–length Packetization, Jon K. Rogers and Pamela C. Cosman, Data Compression Conference, U.S., IEEE Computer Society Press, Mar. 30, 1998, pp. 418–427.

Robust Image Compression With Pacetization: The MPEG–4 Still Texture Case, I. Moccagatta, L. Regunathan, O. Al–Shaykh and H. Chen, Multimedia Signal Processing, IEEE Second Workshop on Multimedia Signal Processing, Dec. 9, 1998, pp. 462–467.

Talluri, R. "Error Resilient Video Coding In the ISO MPEG–4 Standard," IEEE Communication sMagazine, Jun. 1988, vol. 36, Issue 6, pp. 112–119.

* cited by examiner

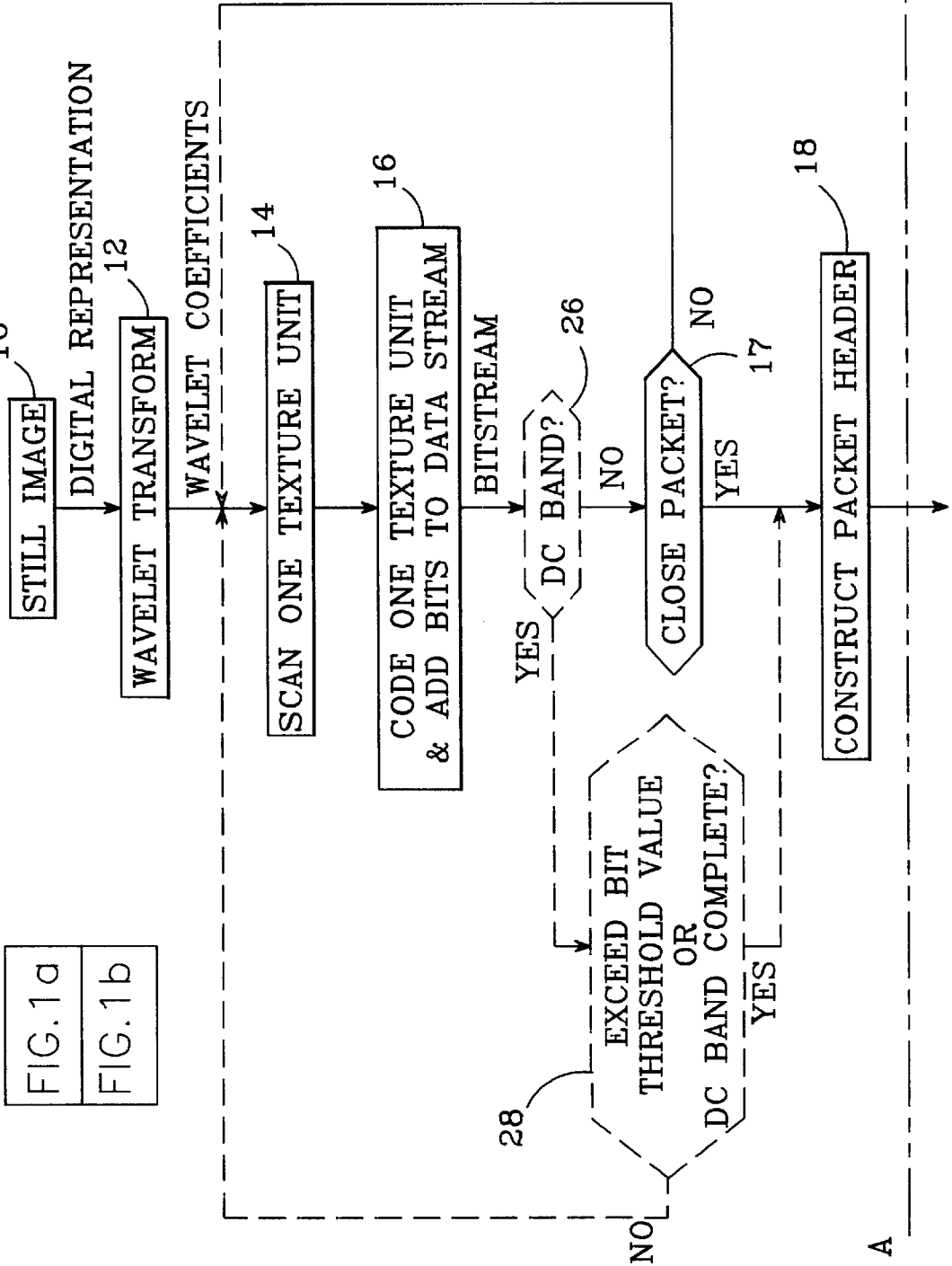

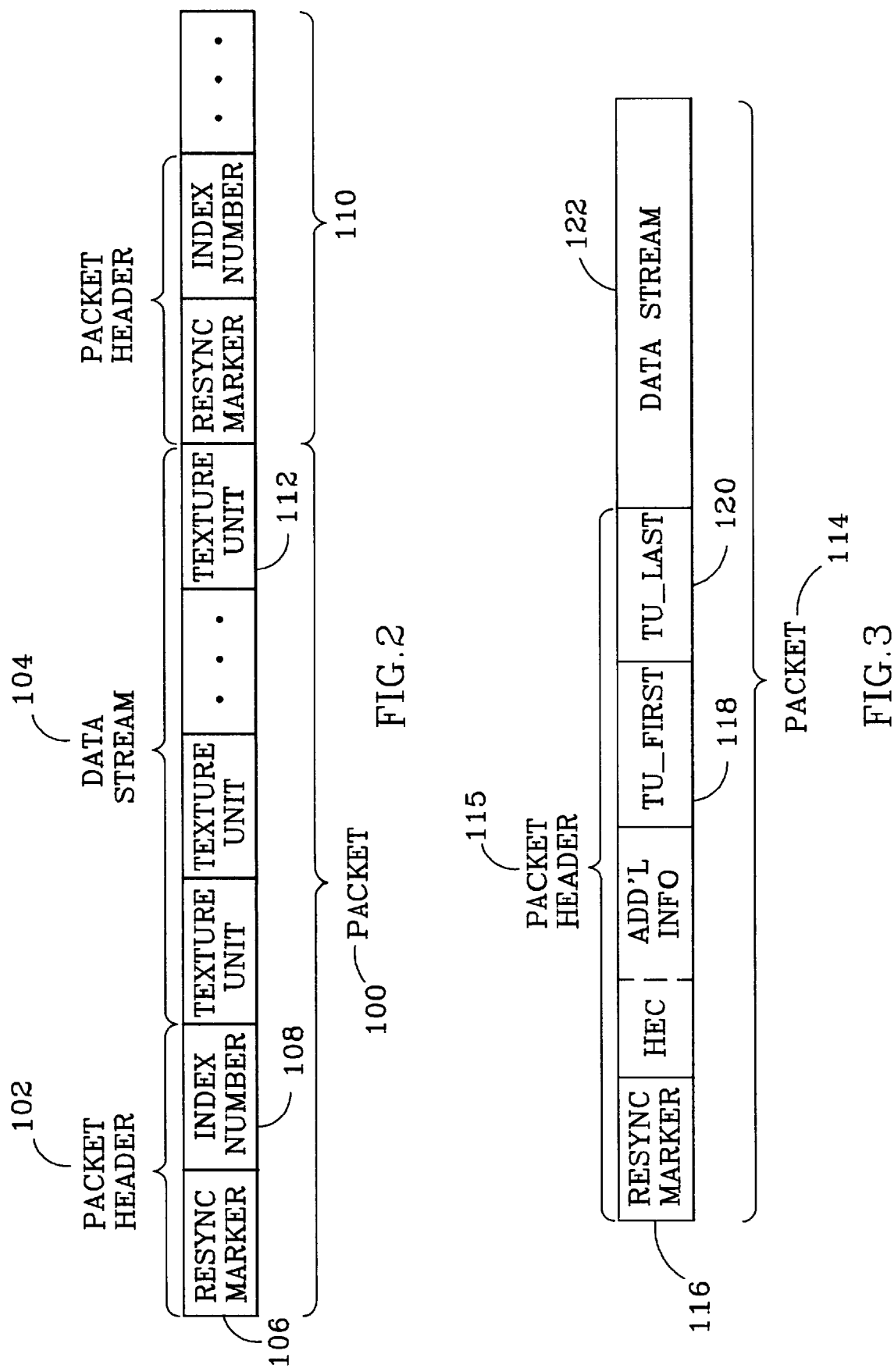

| Test Images | Scanning Method | Corrupted Stream no Error Res. | | Corrupted Stream with Error Res. | |
|---|---|---|---|---|---|
| | | Ave. PSNR-Y (dB) | Std Dev. | Ave. PSNR-Y (dB) | Std Dev. |
| Nature | TD | 15.97 | 0.245 | 18.97 | 0.044 |
| | BB | 8.87 | 1.302 | 20.90 | 0.317 |
| Face | TD | 16.04 | 0.657 | 21.24 | 0.081 |
| | BB | 9.09 | 1.547 | 24.47 | 0.666 |
| Building | TD | 10.10 | 1.645 | 14.16 | 0.045 |
| | BB | 7.95 | 0.954 | 14.49 | 0.293 |

FIG. 12

| Test Images | Scanning Method | Corrupted Stream no Error Res. | | Corrupted Stream with Error Res. | |
|---|---|---|---|---|---|
| | | Ave. PSNR-Y (dB) | Std Dev. | Ave. PSNR-Y (dB) | Std Dev. |
| Nature | TD | 18.92 | 3.697 | 31.54 | 1.111 |
| | BB | 13.68 | 10.199 | 31.25 | 2.278 |
| Face | TD | 19.01 | 3.572 | 34.65 | 1.108 |
| | BB | 9.19 | 5.502 | 34.17 | 0.954 |
| Building | TD | 12.94 | 0.722 | 31.19 | 1.078 |
| | BB | 6.62 | 0.539 | 24.39 | 3.827 |

FIG. 13

ERROR RESILIENT STILL IMAGE PACKETIZATION METHOD AND PACKET STRUCTURE

BACKGROUND OF THE INVENTION

1. Field of the Invention

This invention relates to the fields of image compression and transmission.

2. Description of the Related Art

The flow of information over communication channels such as the Internet and cellular services is increasing rapidly. Unfortunately, channels such as these tend to be noisy. When using wireless services, for example, data bits conveying information can often become flipped or corrupted. With the Internet, a bitstream conveying information is divided into packets, some of which may be delayed or lost en route to their destination. Complicating the situation is that data—particularly graphical data—conveyed over such bandwidth-limited channels is invariably compressed, which increases the adverse affect of lost bits or packets.

A number of standards are in use or are under development that dictate how various pieces of information, such as still images, video, or audio, are to be compressed and transmitted. The proposed MPEG-4 standard, for example, defines a number of "media objects" —including still images, video objects, and audio objects—and prescribes how each object type is to be encoded and decoded. In some instances, the way in which an object is required to be handled increases the importance of a reliable communication channel. The MPEG-4 standard with respect to still images, for example, requires the use of an arithmetic coder (AC) when encoding an image for transmission. Use of an AC provides state-of-the-art compression; however, this coding scheme is very sensitive to channel error propagation.

Various techniques are available to reduce sensitivity to channel error propagation, but each has corresponding disadvantages. For example, an AC could be replaced with a fixed length entropy coder (FLC), but this results in a degradation of coding efficiency that may be unacceptable. Another technique uses an "error resilient entropy code" (EREC), as described in D. W. Redmill and N. G. Kingsbury, "EREC: an Error-Resilient Technique for Coding Variable-Length Blocks of Data", IEEE Transactions on Image Processing, Vol. 5, No. 4, April 1996, pp. 565–574, for example, requires major changes in the coding algorithm; scalability is also adversely affected.

SUMMARY OF THE INVENTION

A packetization method and packet structure are presented which provide a way of transmitting compressed still images over noisy communication channels with improved error resilience. The method does not affect spatial or quality scalability, and a relatively small impact on coding efficiency.

The invention is useful when it is desired to improve the robustness of a bitstream generated when a still image is decomposed with a wavelet transform, regardless of the scanning method used to quantize the wavelet coefficients that result from the decomposition. After the wavelet decomposition, the wavelet coefficients of one "texture unit" are scanned and coded in accordance with a chosen scanning method to produce a bitstream. The bitstreams for an integral number of texture units are assembled into a packet, each of which includes a packet header. Each packet header includes a resynchronization marker, the use of which enables a decoder to resynchronize with the bitstream if synchronization is lost, and an index number, which identifies one of the texture units in the packet and thereby enables a decoder to associate following packets with their correct position in the image.

The invention described herein enables a channel error to be localized to a particular packet, which allows the corrupted data to be discarded and prevents the effects of the error from propagating beyond packet boundaries. It also enables the decoder to resynchronize with the encoder and to associate the un-corrupted data that follows the error-containing packet to its correct position in the image. This is accomplished without degrading the spatial and quality scalability inherent in the encoding scheme, and while some overhead is inevitably required to practice the method, the impact on coding efficiency is relatively small.

The invention is applicable to the MPEG-4 and JPEG-2000 image compression standards currently under development, each of which uses an arithmetic coder (AC). When an AC is used in the encoding process, the inventive method requires that the statistical models used by the AC are reset at the start of each packet.

Further features and advantages of the invention will be apparent to those skilled in the art from the following detailed description, taken together with the accompanying drawings.

BRIEF DESCRIPTION OF THE DRAWINGS

FIGS. 1a and 1b are a flow chart illustrating the basic steps involved in encoding and transmitting still images per the present invention.

FIG. 2 is a diagram of a packet structure per the present invention.

FIG. 3 is a diagram of an alternative packet structure per the present invention.

FIG. 4 is a diagram which specifies the structure of a texture unit per the present invention obtained using a tree-depth scanning method.

FIGS. 5, 6 and 7 are diagrams which specify the structures of respective texture units per the present invention obtained using three variations of a subband-by-subband scanning method.

FIG. 12 is a table presenting signal-to-noise ratio data obtained with and without the use of the present invention when a compressed bitstream is corrupted with random bit errors.

FIG. 13 is a table presenting signal-to-noise ratio data obtained with and without the use of the present invention when a compressed bitstream is corrupted with burst errors.

DETAILED DESCRIPTION OF THE INVENTION

Figure 1B:
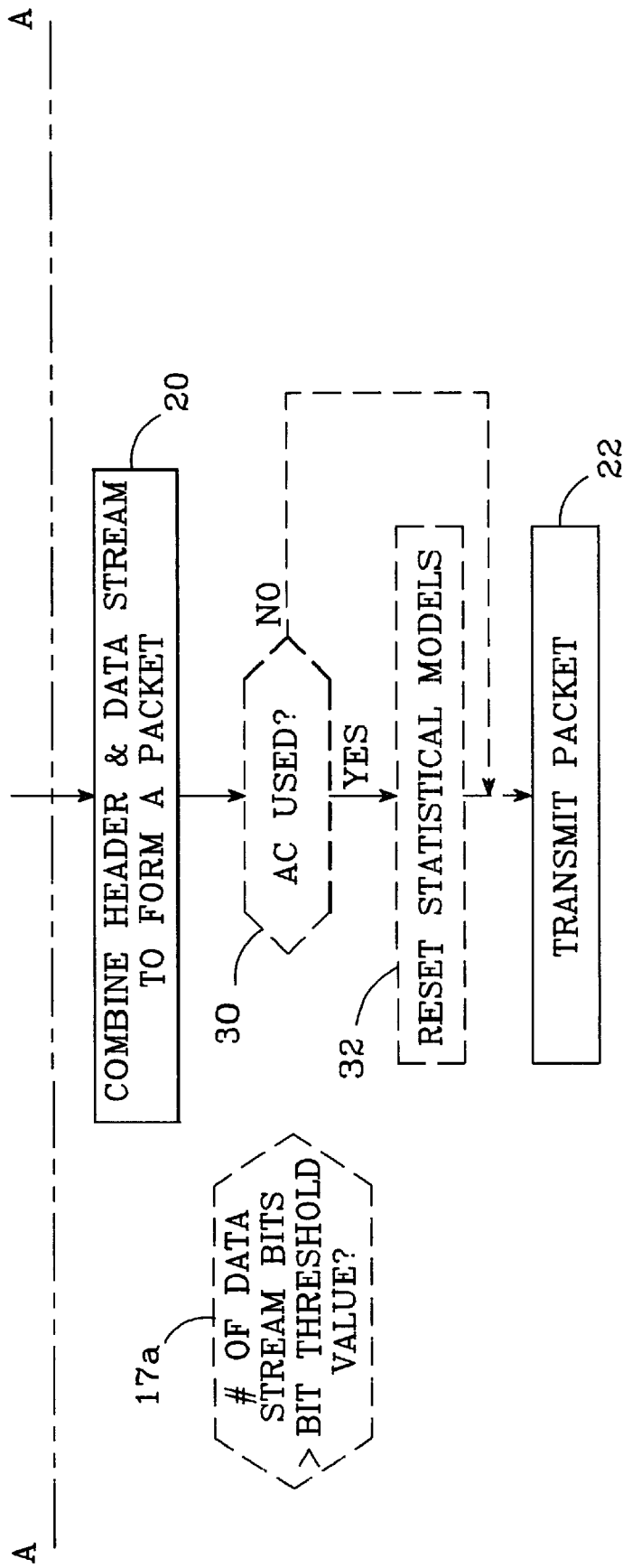

A packetization method which improves the error resiliency of data representing a still image which is being conveyed across a digital communication channel is shown in FIG. 1. Audiovisual scenes to be transmitted across a channel are typically composed of several objects, including still images—such as a fixed background, video objects—such as a talking person, and audio objects. The objects can be of natural or synthetic origin, recorded with a camera or a microphone or generated with a computer.

The invention is applicable to the conveyance of still images, regardless of origin. A still image 10 is captured, with, for example, a digital camera or scanner, or generated by computer, and the image is digitized. To encode the image for transmission, the digital representation of the image is first operated on by a wavelet transform 12. The wavelet transform decomposes the digital representation to produce a number of wavelet coefficients.

Compressed data is inherently sensitive to channel error propagation, especially when coded using an arithmetic coder (AC) as specified by the pending MPEG-4 and JPEG-2000 standards. To improve the error resilience of the bitstream, the bits are segmented into "texture units" for the purpose of forming independently decodable packets. The content of each texture unit is dictated by the particular scanning method used to determine the coding order; texture units produced per several different scanning methods are discussed in detail below. In step 14, the wavelet coefficients that belong to a single texture unit are scanned in accordance with the chosen scanning method. The texture unit is then coded in step 16, producing a bitstream. Texture unit bits that become part of an individual packet make up what is referred to herein as the packet's "data stream".

A test is performed at step 17 to determine whether an additional texture unit should be scanned, coded and added to the data stream, or whether a packet should be closed—i.e., whether the just-coded texture unit should be the last one in the packet. The invention is not limited to any particular method of determining when to close a packet. A preferred method using a "bit threshold value" is discussed below.

A packet header is created for a given data stream in step 18. According to the present invention, the packet header must contain a resynchronization marker and an index number; the packet header components are discussed in detail below.

Each packet header is combined with its associated data stream to form a packet (step 20), which is then transmitted across a communication channel (step 22) to be received and decoded.

Practicing the encoding and packetization method described above enables an error to be isolated to a particular packet so that only the data in that packet need be discarded, eliminating dependencies across packets. The structure of the packets, particularly the packet headers, enables a decoder to identify the affected packet, resynchronize with the encoder, and to associate the data in following, un-corrupted packets with their correct position in the image. These features add a measure of error resilience to the bitstream that would otherwise be lacking.

The number of bits in a packet, i.e., the packet length, is preferably set by the encoder depending on the bandwidth at which the current image is being coded and the characteristics of the communication channel. Based on the length specified by the encoder, a "bit threshold value" is established which specifies the minimum number of bits in a packet. A packet is closed when the number of bits in the packet's data stream, including the justcoded texture unit—first exceeds the bit threshold level. When this occurs, the just-coded texture unit becomes the last unit in the packet. Though a packet is required to have at least as many bits as that specified by the bit threshold value, the number of texture units in a data stream is allowed to vary from packet to packet, as is the size of the texture units within a packet.

This preferred method of determining when a packet is to be closed is illustrated in FIG. 1, which shows a test 17a that implements the "CLOSE PACKET?" test of step 17. If the total number of data stream bits is greater than the bit threshold value, a packet is formed (steps 18 and 20). If not, the next texture unit is scanned and coded (steps 12 and 14), and the bits are counted again. This loop continues until the packet length exceeds the bit threshold value. This process results in packets containing an integral number of complete texture units, which furthers the goal of making the packets independently decodable. Because the texture units are allowed to have varying lengths, the total bit count is likely to vary somewhat from packet to packet.

The wavelet transform (step 12) results in coefficients that fall into different subbands, one of which is the DC band. Due to the importance of the DC band, the DC coefficients are preferably packetized separately from those of the other subbands. This is illustrated in FIG. 1 with a test 26 that is preferably performed after a texture unit is scanned and coded. If test 26 indicates that the just-coded texture unit contains DC band coefficients, another test 28 is performed to determine whether the packet should be closed. In test 28, if the number of bits in the data stream exceeds a bit threshold value (which may be different from the bit threshold value discussed in connection with test 17a, above), or if coding of the DC band is complete, the packet is closed. This insures that DC band data and other subband data are not mixed within a packet.

The coding step (step 16) consists of quantization, followed by a specific type of coding. In both the MPEG0-4 and JPEG-2000 standards, still image encoding is accomplished with the use of an arithmetic coder (AC). Use of an AC requires the use of statistical models, which are built into both the encoder and decoder side of a communication channel. To ensure that each packet is independently decodable, the statistical models are reset to a known statistic at the start of each packet. This is illustrated for the encoder side in FIG. 1, with optional steps 30 and 32: if an AC is used (step 30), the statistical models are reset (step 32) before transmitting the packet. The statistical models must also be similarly reset when decoding the packets. If the models are not reset, the models used to encode/decode the current packet are built when encoding/decoding the previous packet(s). If one of these previous packets is lost, the models used to encode/decode the current packet are likely to be incorrect, and thus the current packet will be decoded incorrectly. Coding efficiency is necessarily reduced when the statistical models must be reset for each packet, but this is necessary to avoid the propagation of errors to other packets.

FIG. 2 is a diagram of a packet structure per the present invention. A packet 100 includes a packet header 102 combined with a data stream 104 which contains an integral number of texture units, with the packet header including, at a minimum, a "resynchronization marker" (RM) 106 and an index number 108. Additional packets 110 follow the last texture unit 112 in the data stream.

Use of an RM 106 enables a decoder to resynchronize with the encoder producing the bitstream if synchronization is lost. The bit pattern chosen to represent the RM should be unique, to avoid emulation of the RM in the bitstream.

An index number 108 must also be included in each packet header. Each texture unit must have an associated absolute reference number which associates the data contained in the unit with its corresponding position in the wavelet transform domain. When each header includes a single index number 108, the index number used is preferably that of the first texture unit in the packet's data stream.

A second index number—preferably that of the last texture unit in the data stream—can be included in the header, at the cost of a slightly greater overhead. The use of two index numbers is shown in the packet structure 114 shown in FIG. 3. Here, packet header 115 includes an RM 116, and index numbers "TU_first" 118 and "TU_last" 120 which identify the first and last texture units, respectively, in the data stream 122. The use of two index numbers further improves error resiliency, particularly in the event that one of the two index numbers is itself corrupted. In this case, the two indexes can be compared to detect the occurrence of an error.

A one-bit header extension code (HEC) 124 may also be included in packet header 115. When set to a predetermined value, the HEC indicates that it is followed by additional information that may be of use to the decoder.

Conveying a still image per the packetization method and packet structure described herein provides several benefits. Assume that a segment of the bitstream is corrupted by channel errors. When the decoder reaches the corrupted segment, it loses its synchronization with the encoder. Due to the nature of the data, the error is usually detected some undefined distance away from where the error occurred. The decoder can use the elements contained in the packet header to detect the error (by comparing the index numbers of successive packets or detecting the occurrence of an RM before a texture unit is completely decoded), resynchronize with the encoder (using the RM and the index number), discard the corrupted data (using the index numbers to identify the affected packet), and associate the un-corrupted data in following packets to its correct position in the wavelet transform domain (using index numbers). In addition, if an AC is used and the statistical models are reset, the effect of an error will not propagate beyond the packet boundaries.

The present invention requires no changes to the coding algorithm, so that the algorithm's features—such as spatial and quality scalability—are not affected. The packetization approach requires very few changes to the syntax, and only a small amount of overhead, so that coding efficiency is only slightly degraded.

As explained above, the structure of the texture units that make up the data stream of each packet is dependent on the particular scanning method used. Several specific scanning methods and the texture structures that result from their use will now be discussed. Note that these and other scanning methods are equally applicable to both the DC band and the higher subbands.

Tree-depth Scanning

This scanning method, permitted under the proposed MPEG-4 standard, scans the wavelet coefficients and organizes them into a tree structure. The method uses the zero-tree algorithm.

Figure 4:
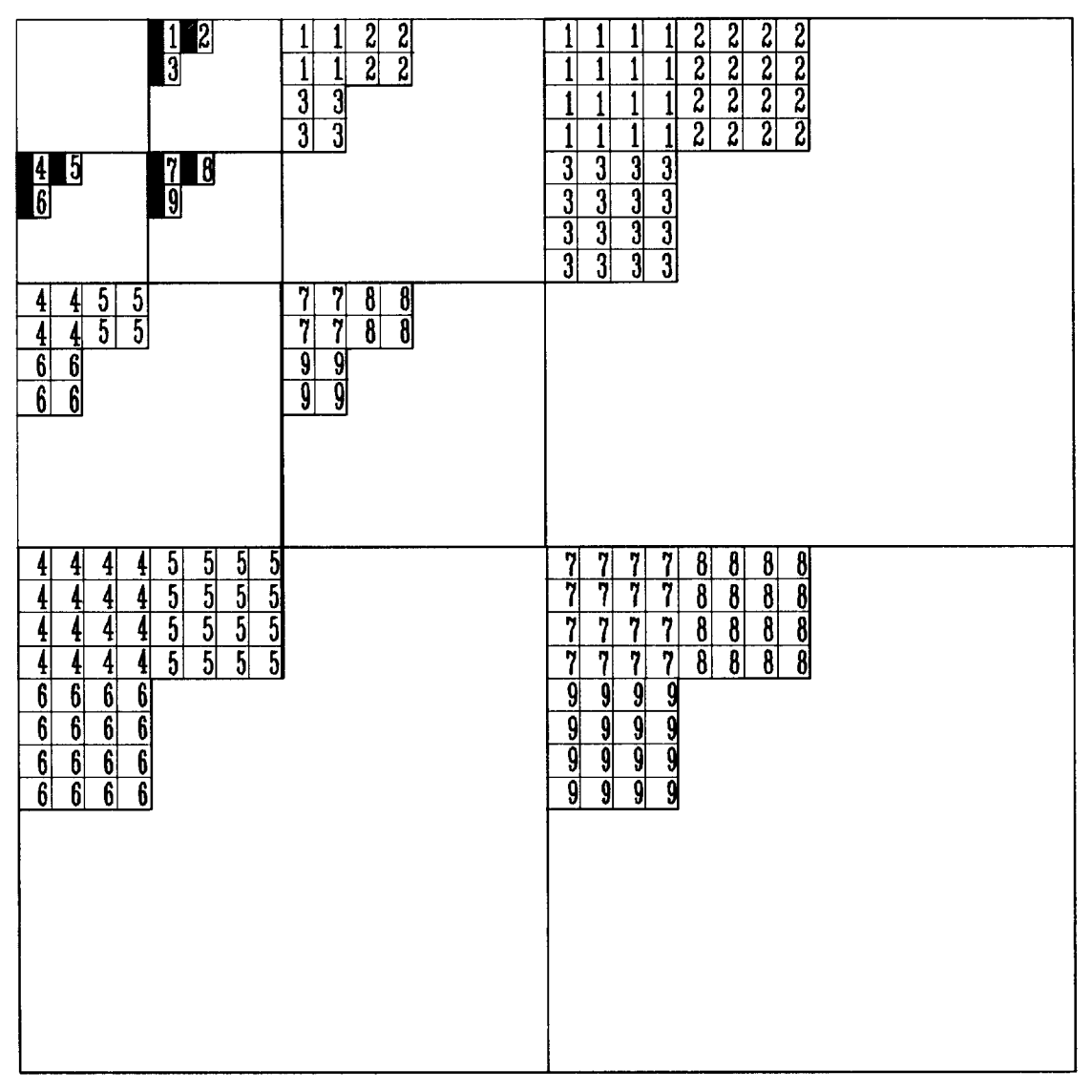

When the wavelet coefficients are tree-depth scanned, each of the packet's texture units consist of the bitstream generated when encoding one tree structure, as specified in the diagram shown in FIG. 4. In FIG. 4, all of the coefficients which belong to the same texture unit are indicated with the same identifier number; i.e., all the coefficients labeled "1" belong to the same texture unit, all the coefficients labeled "2" belong to the same texture unit, etc. Resynchronization markers are represented with black blocks. The total number of texture "blocks", i.e., the portion of a texture unit which belongs to a single subband, is a function of the image size and the number of levels used in the wavelet decomposition. Using tree-depth scanning, the texture blocks are formed in a way that reflects and follows the scanning method used to encode the coefficient, thereby minimizing coding efficiency degradation.

Subband-by-subband Scanning

This scanning method, also permitted under the proposed MPEG-4 standard, scans the wavelet coefficients subband-by-subband. The method uses the zero-tree algorithm. Three types of texture units have been defined which use this scanning method:

Type 1

Figure 5:
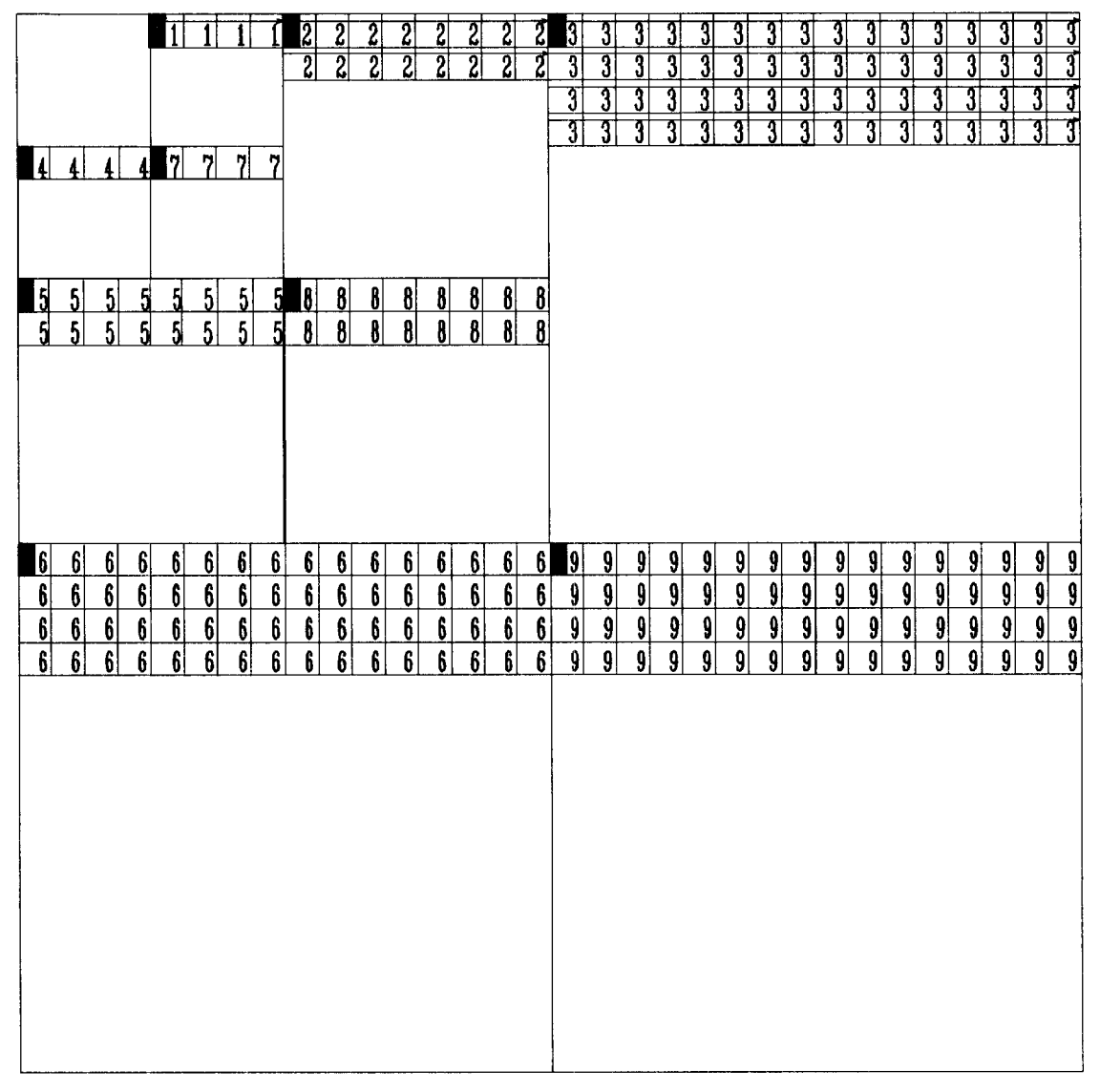

For this texture unit type, each of the packet's texture units consist of the bitstream generated when encoding a "slice" of subband coefficients; i.e., an integer number of consecutive lines of a subband, as specified in FIG. 5. Each texture block is a slice of subband coefficients, which are scanned in a raster scan fashion. The arrows indicate the order in which the coefficients are scanned in each block. This scanning method preserves the order of the bits generated by the encoder, so that scalability is not affected.

Type 2

Figure 6:
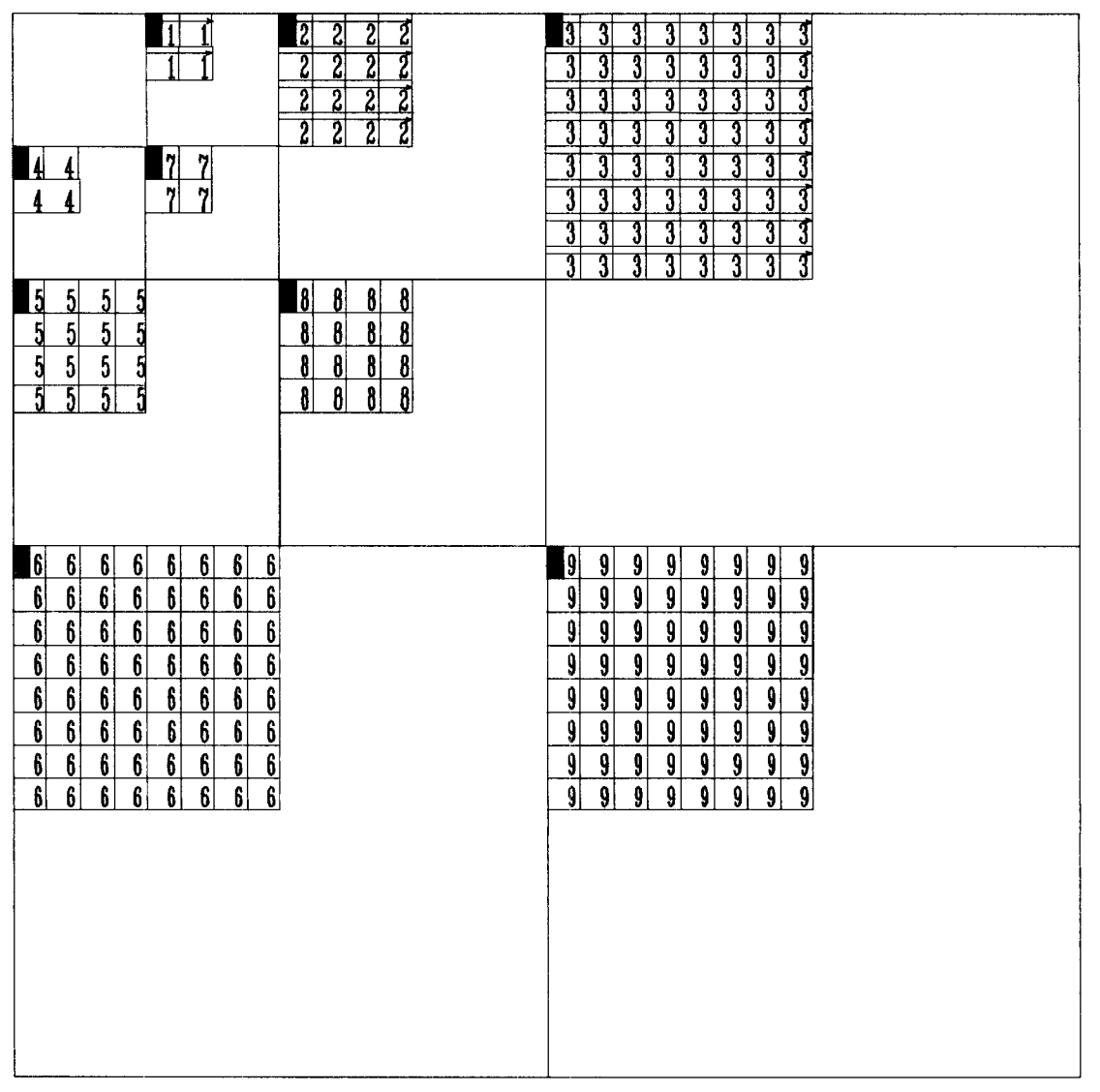

For this texture unit type, each of the packet's texture units consist of the bitstream generated when encoding a block of subband coefficients, as specified in FIG. 6. Packets are formed by collecting subband blocks in a raster scan order. This texture unit structure does not degrade scalability. However, if a subband block is lost, some of the frequency components of a rectangular area in the image domain are lost.

Type 3

Figure 7:
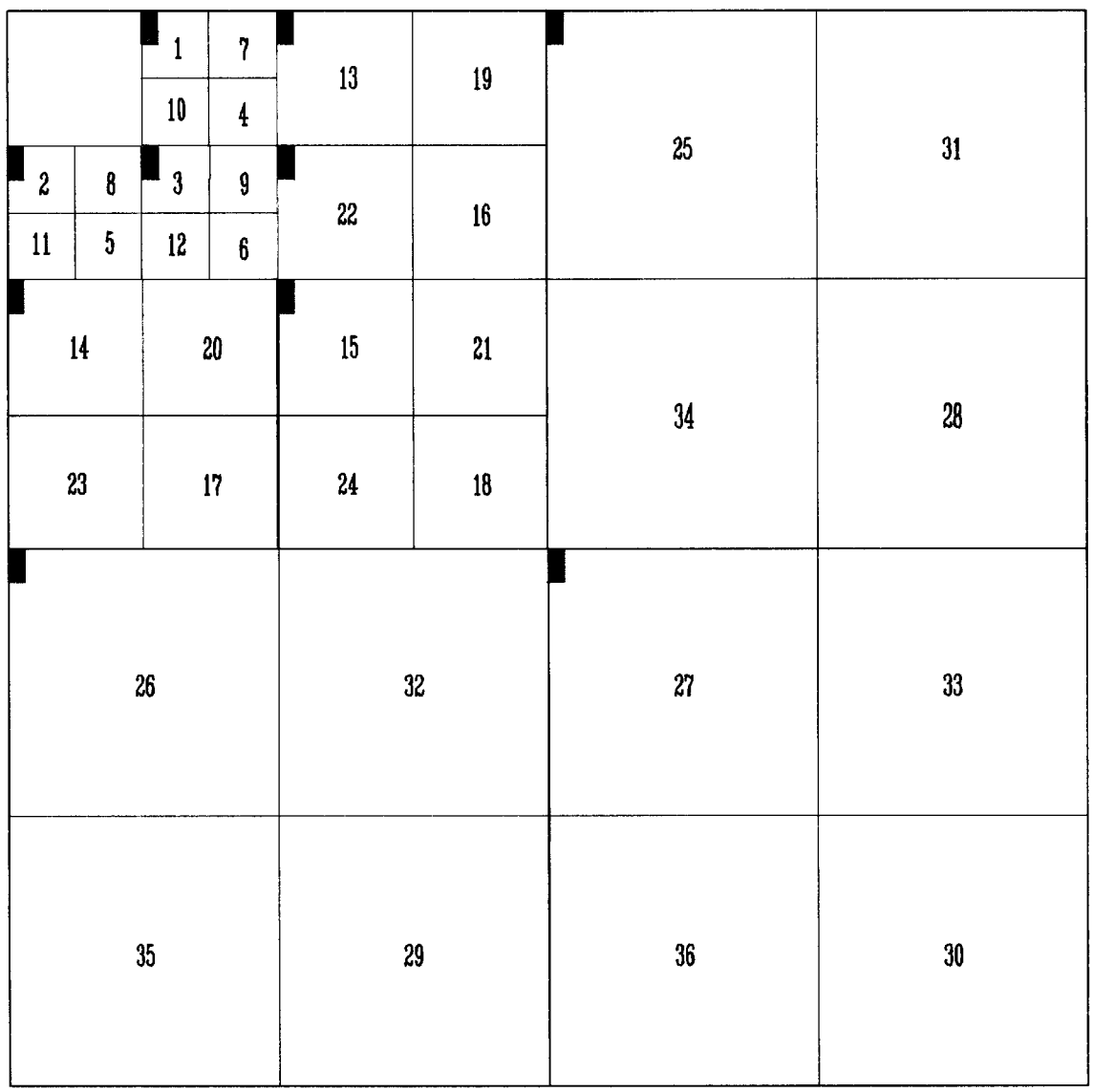

This texture unit type is similar to the type 2, in that each of the packet's texture units consist of the bitstream generated when encoding a block of subband coefficients. The subbands are divided into blocks, and coefficients within each block are scanned and coded in a raster fashion as shown in FIG. 6. However, packets are formed by collecting packets in a "check-board" fashion. This is illustrated in the diagram of FIG. 7. Here, the numbers in the blocks indicate the order in which the blocks are scanned when collecting texture units for a packet. This approach facilitates error concealment: when a packet is lost, its texture units can be recovered by interpolating the 4 neighboring blocks—each of which belongs to a different packet.

Subband-by-subband Scanning/bit-plane by Bit-plane Order

Figures 8, 11:
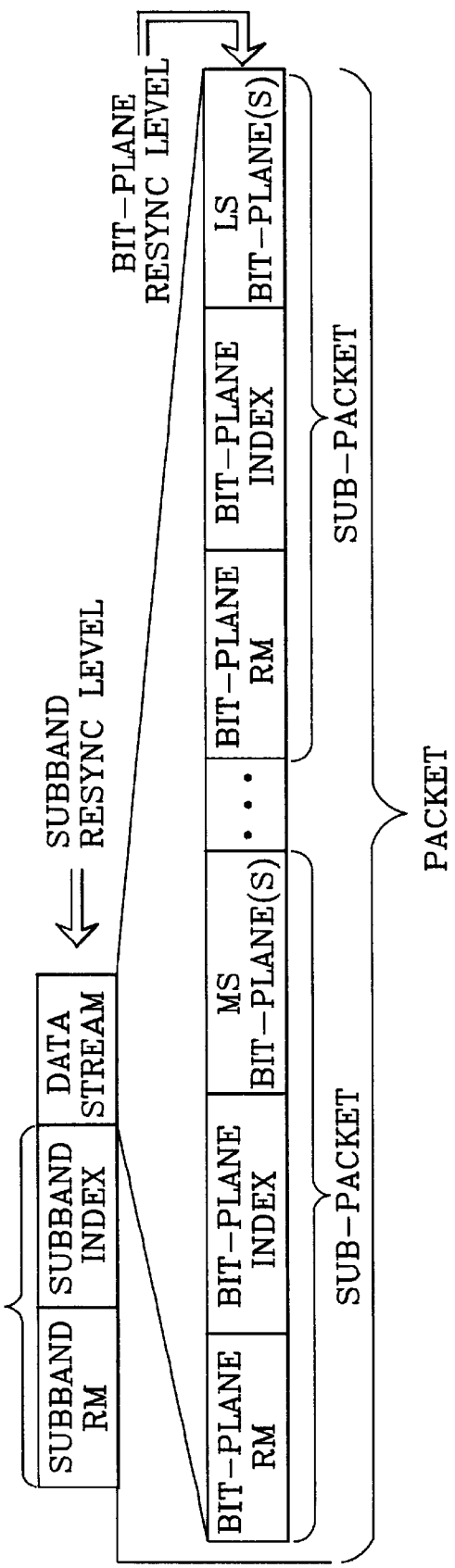
FIG. 8 is a diagram of an alternative packet structure per the present invention which allows resynchronization at the subband level and/or at the bit-plane level.
FIG. 11 is a table presenting rate and overhead data when practicing the present invention.

This scanning method, permitted under the proposed JPEG-2000 standard, scans the wavelet coefficients subband-by-subband, in a progressive by resolution bit-plane by bit-plane order, with coding performed by a context-based arithmetic coder. Each of the resulting texture units can be partial or complete subbands, and may contain one or more complete bit-planes. An example packet structure illustrating this approach is shown in FIG. 8. As before, a pack et includes a packet header that includes an RM and an index number, here labeled as "SUBBAND RM" and "SUBBAND INDEX", respectively, followed by a data stream. The data stream is made up of texture units which contain the bitstreams generated when coding one or more bit-planes of a subband. As shown in FIG. 8, the data stream can be divided into "sub-packets" which each contain one bit-plane; alternatively, a sub-packet may contain more than one bit-plane, with a bit threshold value used to indicate when a sub-packet is to be closed. The bit-planes are preferably ordered within the data stream from most significant (MS) to least significant (LS). When this structure is used, the encoder can also insert resynchronization markers and index numbers into each sub-packet at the bit-plane level. In this case, a sub-packet header which includes a BIT-PLANE RM and a BIT-PLANE INDEX is attached to each sub-packet, with the index number identifying the first bit-plane of the subpacket.

Figure 9:
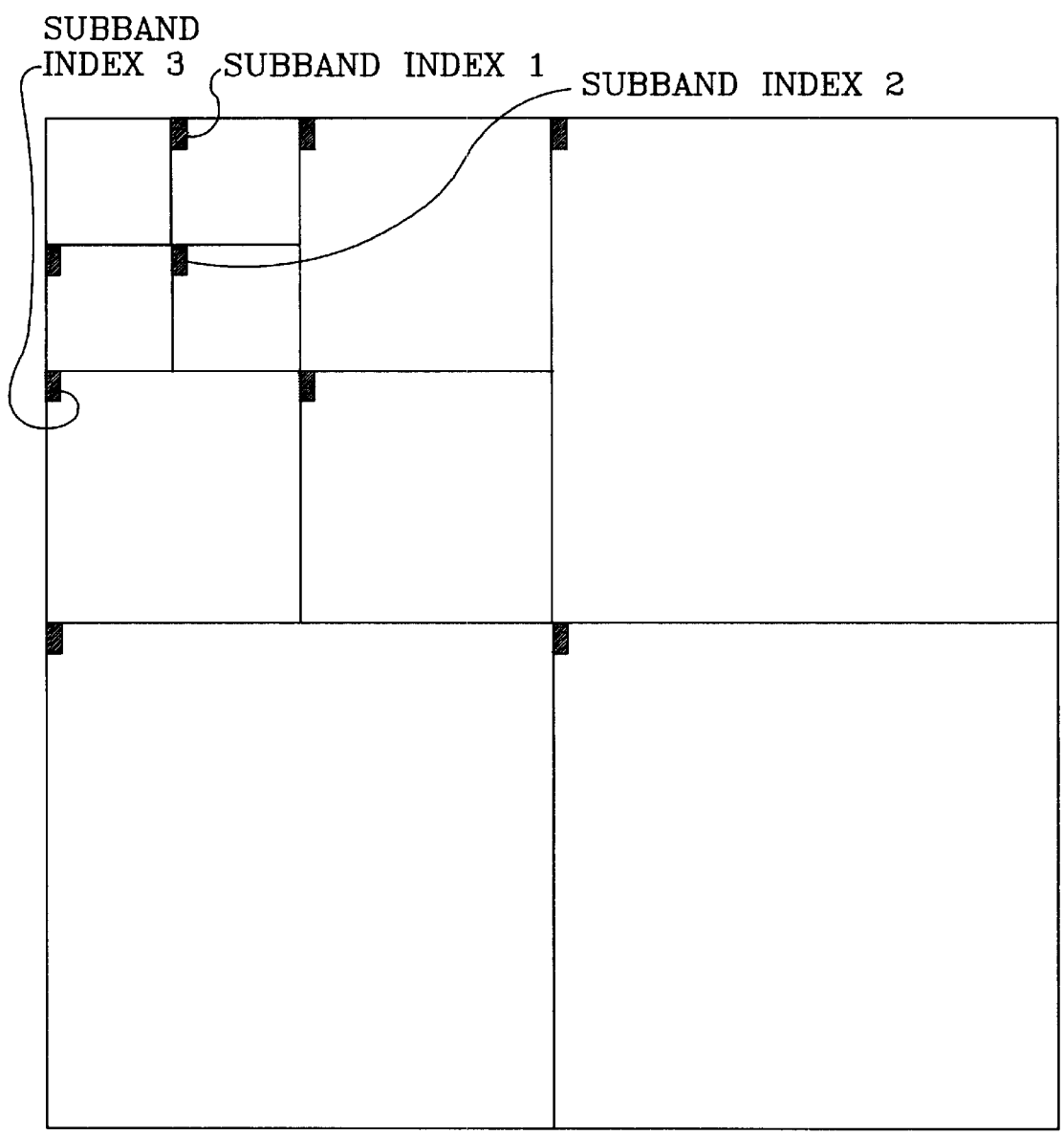
FIG. 9 is a diagram illustrating resynchronization at the subband level.
Figure 10:
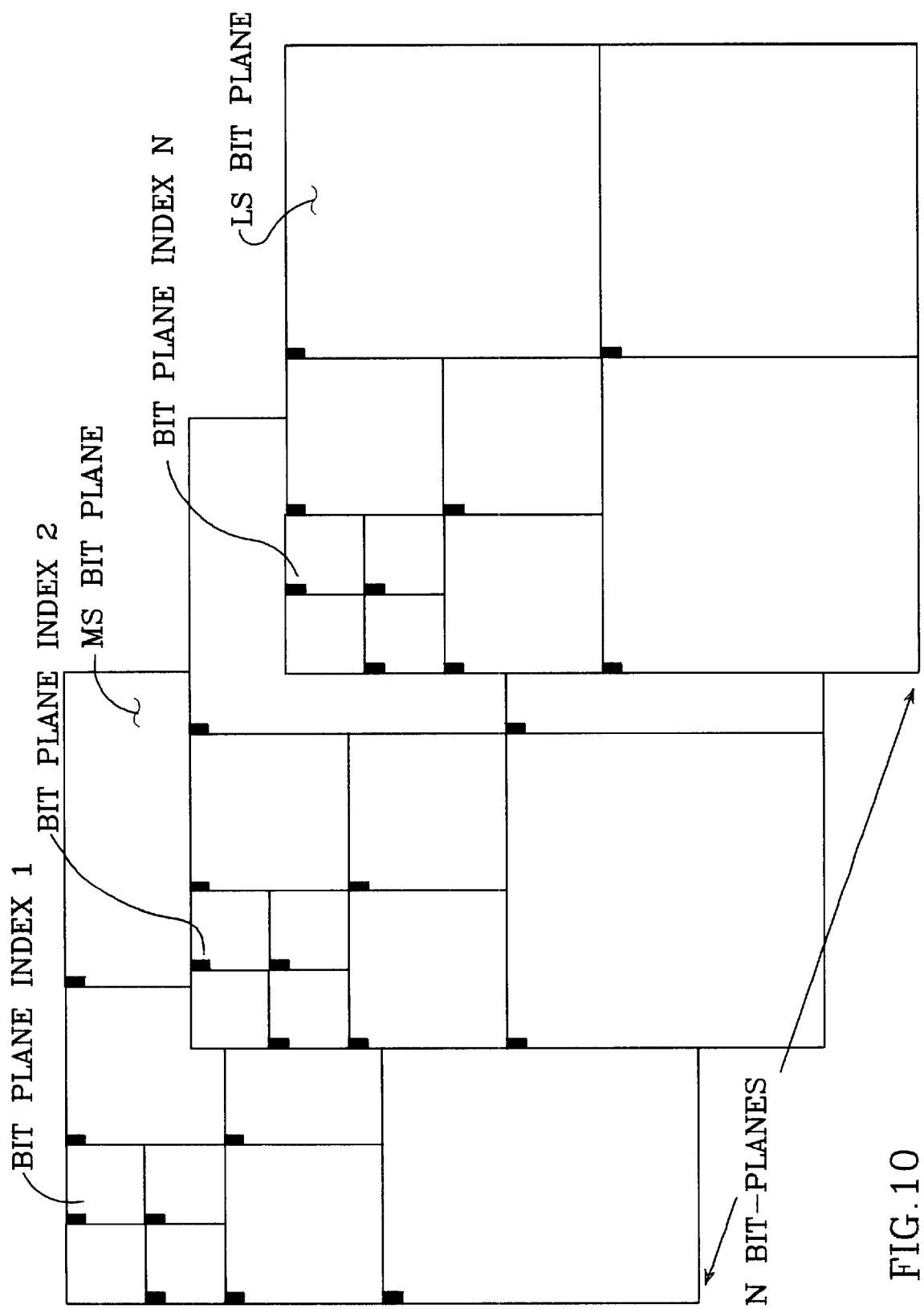
FIG. 10 is a diagram illustrating resynchronization at the bit-plane level.

This packet structure permits synchronization between encoder and decoder to occur at two levels. A diagram illustrating resynchronization at the subband level is shown in FIG. 9, with the subband RMs shown as black boxes. However, due to the inclusion of the bit-plane RM and index number, resynchronization can also occur at the bit-plane level, as illustrated in FIG. 10.

FIGS. 11, 12 and 13 present simulated results from use of the invention to improve the error resilience of a bitstream conveying a compressed still image. Data for standard MPEG-4 still texture images entitled "Nature", "Face", and "Building", each a 1024×1024, 16 bits/pixel (4:2:0) image, are presented. FIG. 11 presents the peak signal-to-noise ratio (PSNR) for the three images, the rate in bits per pixel (bpp) for the MPEG-4 Still Texture Baseline, the rate when using the packetization method described herein, and the overhead required when using the present packetization method. Data is included for both the tree-depth (TD) and subband-by-subband (BB) scanning methods.

FIG. 12 shows PSNR-Y (the luminance component) when a compressed bitstream is corrupted using random bit errors with a bit error rate (BER) of $10^{-3}$, and is packetized per the present method. The initial part of the bitstream, containing the packet header and DC band information, is protected from errors. The PSNR-Y values shown are averages over 50 runs of the error generation program. No concealment was used. The missing wavelet coefficients were replaced by zero value coefficients and used in the inverse wavelet transform. For comparison, FIG. 12 also presents results obtained when no packetization is used; in this case, resynchronization with the encoder is not possible and thus the decoder loses synchronization.

FIG. 13 is similar to FIG. 12, except that here the compressed bitstream was corrupted using burst errors with a BER of $10^{-3}$ and a length of 10 ms.

As FIGS. 11–13 indicate, the present packetization method and packet structure provide good error robustness, without disturbing the coding strategies and the functionalities supported by the MPEG-4 Still Texture standard or other similar coding standards.

While particular embodiments of the invention have been shown and described, numerous variations and alternate embodiments will occur to those skilled in the art. Accordingly, it is intended that the invention be limited only in terms of the appended claims.

We claim:

1. A method of encoding a still image which improves the error resiliency of the resulting bitstream, comprising the steps of:

decomposing a still image with a wavelet transform, choosing a scanning method with which to scan the wavelet coefficients produced by said decomposition, scanning the wavelet coefficients of a texture unit which is defined in accordance with said chosen scanning method, coding the wavelet coefficients of said texture unit to produce a bitstream, adding said bitstream to a packet which includes a data stream, all of the bits of the bitstream resulting from said coding of said texture unit becoming part of said packet's data stream, determining, in accordance with a first predetermined criterion, whether the packet associated with said data stream should be closed, repeating the steps of scanning and coding the wavelet coefficients of a texture unit to produce a bitstream and adding the resulting bitstream to said data stream for additional texture units until said first predetermined criterion for closing said packet has been met, constructing a packet header for said data stream, said packet header comprising:

a resynchronization marker for enabling a decoder to resynchronize with the encoder producing said bitstream if synchronization is lost, and at least one index number, each of said index numbers identifying a respective one of the texture units in the packet header's associated data stream, for enabling a decoder to associate following packets with their correct position in the wavelet transform domain, and combining said packet header and its associated data stream to form a packet suitable for transmitting over a communication channel, the use of said encoding method providing independently decodable packets and thereby improving the error resilience of said bitstream by eliminating dependencies across the packets and isolating corrupted data to a single packet.

2. The method of claim 1, wherein said decomposition produces a DC band and a plurality of higher subbands, further comprising the steps of determining whether a texture unit contains coefficients from said DC band, and if so, determining, in accordance with a second predetermined criterion, whether the packet associated with the data stream resulting from the coding of said DC texture unit should be closed, said second predetermined criterion selected to produce packets having respective data streams that contain bits representing DC band coefficients exclusively.

3. The method of claim 2, wherein said second predetermined criterion comprises determining whether the length of said data stream exceeds a predetermined bit threshold value.

4. The method of claim 2, wherein said second predetermined criterion comprises determining whether all of the coefficients from said DC band have been coded.

5. The method of claim 1, wherein said wavelet transform is a dyadic wavelet transform and said chosen scanning method comprises tree-depth scanning which organizes said wavelet coefficients into at least one tree structure, each of said texture units consisting of all the bits that result from coding a respective one of said tree structures.

6. The method of claim 1, wherein said chosen scanning method comprises subband-by-subband scanning, each of said texture units consisting of the bits that result from coding an integer number of consecutive lines of a subband.

7. The method of claim 1, wherein said chosen scanning method comprises subband-by-subband scanning, each of said texture units consisting of the bits that result from coding a block of coefficients from a respective subband, each of said packets formed by collecting said texture units in a raster scan order.

8. The method of claim 1, wherein said chosen scanning method comprises subband-by-subband scanning, each of said texture units consisting of the bits that result from coding a block of coefficients from a respective subband, each of said packets formed by collecting texture units in a check-board fashion such that if one of said packets is lost its texture units can be interpolated from its four neighboring blocks which belong to different packets, said scanning and packet formation steps facilitating error concealment.

9. The method of claim 1, wherein said coding step comprises quantizing and arithmetically coding said wavelet coefficients to produce said bitstream.

10. The method of claim 9, further comprising the step of resetting the statistical models used in said arithmetic coding step prior to encoding and decoding each of said packets.

11. The method of claim 9, wherein said quantizing and coding of said wavelet coefficients is accomplished using the zero-tree algorithm.

12. The method of claim 9, wherein said quantizing and coding of said wavelet coefficients is accomplished using context-based arithmetic coding.

13. The method of claim 1, wherein said scanning step comprises subband-by-subband scanning in a bit-plane by bit-plane order, each of said texture units comprising at least one bit-plane.

14. The method of claim 13, further comprising the steps of dividing a data stream into sub-packets, each of which contains at least one bit-plane, a resynchronization marker, and an index number which identifies the sub-packet's first bit-plane.

15. The method of claim 1, wherein said first predetermined criterion is met when the total number of bits in said data stream, including all of the bits of the most-recently-coded texture unit, exceeds a predetermined bit threshold value.

16. The method of claim 1, wherein said predetermined bit threshold value varies with the bandwidth of the image being coded.

17. The method of claim 1, wherein said packet header includes two unique index numbers, said index numbers absolutely identifying the first texture unit and the last texture unit in the packet's data stream.

18. The method of claim 1, wherein said packet header further comprises a one-bit header extension code (HEC) which, when set to a predetermined value, indicates that the packet header includes additional information.

19. A packet structure suitable for use when transmitting a bitstream produced by encoding a still image, comprising:

a data stream, said data stream comprising at least one texture unit, each of said texture units comprising a respective bitstream generated by scanning and coding the wavelet coefficients produced by a wavelet decomposition of a still image in accordance with a predetermined scanning method, and a packet header, said packet header including:

a resynchronization marker for resynchronizing a decoder to the encoder which produces said bitstream if synchronization is lost, and an index number which absolutely identifies one of said texture units in said data stream for enabling a decoder to associate following packets with their correct position in the wavelet transform domain, said packet header and said data stream combined to form a packet suitable for conveying a bitstream representing at least a portion of a still image across a communication channel.

20. The packet structure of claim 19, wherein said wavelet decomposition uses a dyadic wavelet transform and said wavelet coefficients are tree-depth scanned, each of said texture units comprising the bits produced when coding one of the tree structures resulting from said tree-depth scan.

21. The packet structure of claim 19, wherein said wavelet coefficients are subband-by-subband scanned, each of said texture units comprising the bits that result from coding an integer number of consecutive lines of a respective subband.

22. The packet structure of claim 19, wherein said wavelet coefficients are subband-by-subband scanned, each of said texture units comprising the bits that result from coding a block of coefficients from a respective subband, each of said packets formed by collecting said texture units in a raster scan order.

23. The packet structure of claim 19, wherein said wavelet coefficients are subband-by-subband scanned, said packets formed by collecting said texture units in a check-board fashion such that a lost texture unit can be interpolated from its four neighboring blocks which belong to different packets.

24. The packet structure of claim 19, wherein said wavelet coefficients are subband-by-subband scanned in a bit-plane by bit-plane order, each of said texture units comprising at least one of the bit-planes of one subband.

25. The packet structure of claim 24, wherein said data stream is divided into sub-packets, each of which contains at least one bit-plane, a resynchronization marker, and an index number which identifies the sub-packet's first bit-plane.

26. The packet structure of claim 19, wherein said bitstream comprises quantized and arithmetically coded wavelet coefficients, said wavelet coefficients produced by said wavelet decomposition.

27. The packet structure of claim 19, wherein said data stream contains an integral number of complete texture units such that the total number of bits in said data stream is greater than a predetermined bit threshold value.

28. The packet structure of claim 19, wherein said packet header includes two index numbers which absolutely identify the first texture unit and the last texture unit in the packet's data stream.

29. The packet structure of claim 19, wherein said packet header further comprises a one-bit header extension code (HEC) which, when set to a predetermined value, indicates that the packet header includes additional information.

* * * * *